US008310479B2

(12) United States Patent
Kawagoshi

(10) Patent No.: US 8,310,479 B2
(45) Date of Patent: Nov. 13, 2012

(54) DISPLAY PANEL DRIVE APPARATUS AND DISPLAY PANEL DRIVE METHOD

(75) Inventor: Hirokazu Kawagoshi, Siga (JP)

(73) Assignee: RENESAS Electronics Corporation, Kawasaki-shi, Kanagawa (JP)

( * ) Notice: Subject to any disclaimer, the term of this patent is extended or adjusted under 35 U.S.C. 154(b) by 563 days.

(21) Appl. No.: 12/585,440

(22) Filed: Sep. 15, 2009

(65) Prior Publication Data

US 2010/0085347 A1 Apr. 8, 2010

(30) Foreign Application Priority Data

Oct. 7, 2008 (JP) ................................ 2008-260287

(51) Int. Cl.
*G06F 3/038* (2006.01)

(52) U.S. Cl. ........................................ 345/213; 345/211

(58) Field of Classification Search ........................ None
See application file for complete search history.

(56) References Cited

U.S. PATENT DOCUMENTS

| | | | | |
|---|---|---|---|---|
| 6,552,676 | B1 * | 4/2003 | Bjorksten et al. | 341/143 |
| 7,944,439 | B2 * | 5/2011 | Mamba et al. | 345/211 |

FOREIGN PATENT DOCUMENTS

| | | |
|---|---|---|
| JP | 3-53776 | 3/1991 |

* cited by examiner

*Primary Examiner* — Joseph Haley
(74) *Attorney, Agent, or Firm* — McGinn IP Law Group, PLLC

(57) ABSTRACT

A display panel drive apparatus includes a source driver that drives each unit dot in accordance with a time-divisional clock, and a booster circuit that generates a supply voltage to be supplied to the source driver based on a clock having a rising edge and a falling edge each coinciding with an off-period of the time-divisional clock. The display panel drive apparatus performs a time-divisional driving operation during one horizontal period.

4 Claims, 5 Drawing Sheets

DISPLAY PANEL DRIVE APPARATUS AND DISPLAY PANEL DRIVE METHOD

BACKGROUND

1. Field of the Invention

The present invention relates to a display panel drive apparatus, and particularly, to a display panel drive apparatus based on a time-divisional drive method.

2. Description of Related Art

An LCD (Liquid Crystal Display) controller driver IC (Integrated Circuit) for use with mobile phones normally includes a plurality of source drive circuits (source drivers).

As a circuit for generating a power supply for allowing the plurality of source drivers to operate, a booster circuit is normally employed. Here, in association with the behavior of a clock being input to the booster circuit, ripples undesirably occur in the output of the booster circuit. In some cases, the ripples may affect the output of the source drivers.

For example, a technique is proposed in Japanese Unexamined Patent Application Publication No. 3-53776, being directed to reduce the effect of ripples occurring in the output voltage from the booster circuit to source drivers. In the technique shown in Japanese Unexamined Patent Application Publication No. 3-53776, a switching element for the booster circuit operates in a blank period as to a horizontal drive signal for one frame. Thus, noises attributed to the switching operation of the booster circuit are prevented from appearing on the screen.

On the other hand, as a method for driving a display panel employing liquid crystal, it has recently been proposed to time-divisionally drive RGB in one horizontal period.

SUMMARY

The present inventors have found a problem that the switching element cannot switch between on and off unless one horizontal period is elapsed, with the technique such as shown in Japanese Unexamined Patent Application Publication No. 3-53776. Accordingly, the frequency of on/off of the switching element is limited based on one horizontal period. It has now been discovered that the ripples therefore become disadvantageously great.

A first exemplary aspect of the present invention is a display panel drive apparatus performing a time-divisional driving operation during one horizontal period, including a source driver that drives each unit dot in accordance with a time-divisional clock, and a booster circuit that generates a supply voltage to be supplied to the source driver based on a clock having a rising edge and a falling edge each coinciding with an off-period of the time-divisional clock.

A second exemplary aspect of the present invention is a display panel drive method for performing a time-divisional driving operation during one horizontal period, including driving each unit dot in accordance with a time-divisional clock, and generating a supply voltage to be supplied to a source driver that drives each unit dot based on a clock having a rising edge and a falling edge each coinciding with an off-period of the time-divisional clock.

The present configuration achieves a reduction in the displaying-related noises appearing on the display panel attributed to the rising or falling edge of a clock input to the booster circuit.

Additionally, even when RGB are time-divisionally controlled, the ripples and hence the displaying-related noises can be reduced.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
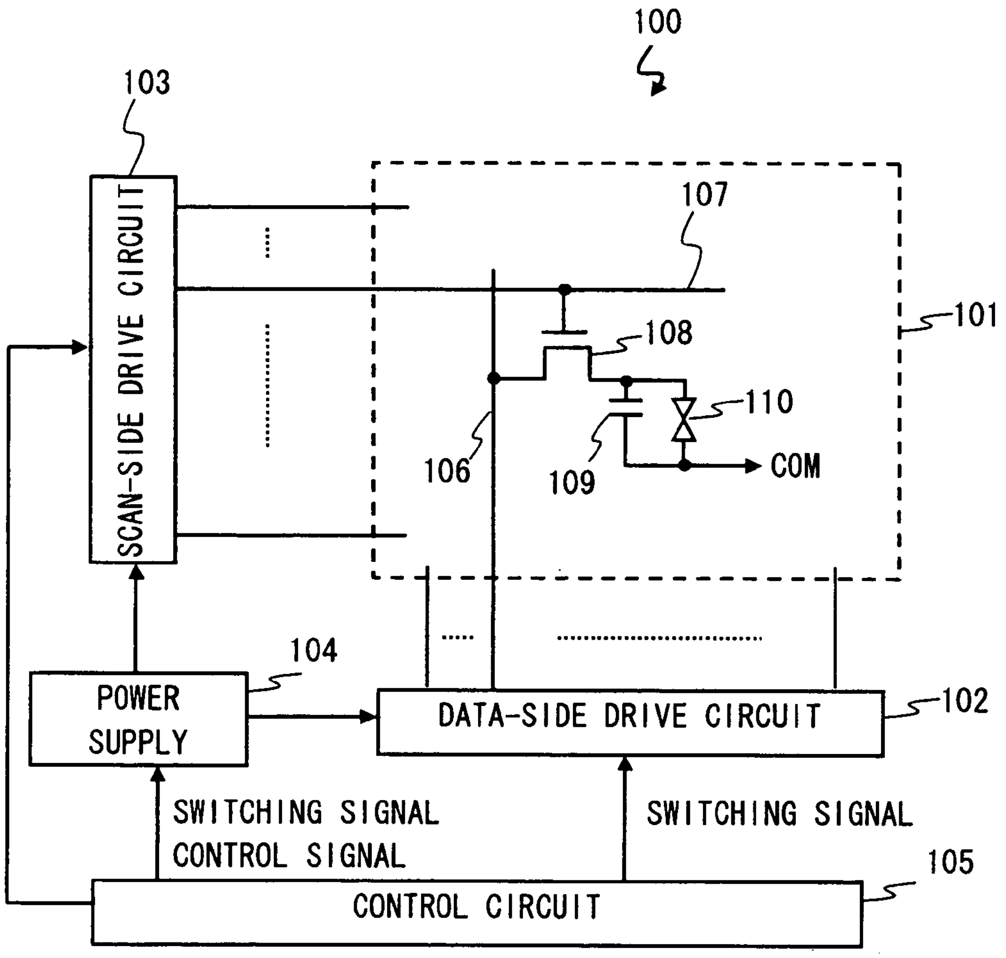
FIG. 1 is a block diagram showing an overall configuration of a liquid crystal panel display apparatus according to an exemplary embodiment of the present invention.

In the following, exemplary embodiments of the present invention will be described in detail referring to the drawings.

FIG. 1 is a block diagram showing an overall configuration of a liquid crystal display apparatus 100 according to an exemplary embodiment of the present invention. The liquid crystal display apparatus 100 includes a liquid crystal display panel 101, a data-side drive circuit 102, a scan-side drive circuit 103, a power supply circuit 104, and a control circuit 105.

The liquid crystal display panel 101 is a display panel for displaying an image. The data-side drive circuit 102 outputs an analog signal voltage (gradation voltage) being generated based on a digital image signal (hereinafter referred to, as data) to thereby drive data lines 106. The scan-side drive circuit 103 outputs a select/non-select voltage for a TFT (Thin Film Transistor) 108 to thereby drive scanning lines 107. The power supply circuit 104 provides the supply voltage to the data-side drive circuit 102 that outputs the analog signal voltage and to the scan-side drive circuit 103 that outputs the select/non-select voltage. The control circuit 105 generates a timing signal (switching signal) for driving the data lines 106 and the scanning lines 107, a timing or control signal for controlling a boosting operation of the power supply circuit 104, and the like, for controlling the scan-side drive circuit 103, the data-side drive circuit 102, and the power supply circuit 104.

The liquid crystal display panel 101 includes the data lines 106 being aligned horizontally and extending vertically in FIG. 1, and the scanning lines 107 being aligned vertically and extending horizontally in FIG. 1. A pixel is formed at each point where the data lines 106 and scanning lines 107 intersect with each other. As shown in FIG. 1, each pixel includes the TFT 108, a pixel capacitor 109, and a liquid crystal element 110. In the following, the pixel capacitor and the liquid crystal element are collectively referred to as a panel capacitor. The gate of the TFT 108 is connected to the scanning line 107. The source (drain) of the TFT 108 is connected to the data line 106. The drain (source) of the TFT 108 is connected to the pixel capacitor 109 and the liquid crystal element 110. The other end of the pixel capacitor 109 and the liquid crystal element 110 is connected to a common electrode COM. The liquid crystal element 110 is a capacitive element. In a multicolor liquid crystal display panel, each pixel is constituted by a group of dots of R, G and B. Each dot includes the TFT 108, the pixel capacitor 109, and the liquid crystal element 110. The liquid crystal display panel 101 according to the present exemplary embodiment is a liquid crystal display panel displaying in multi-colors and being driven time-divisionally. Accordingly, one source driver (which will be described later) included in the data-side drive circuit 102 provides each of R, G and B dots (unit dots) with a gradation voltage generated based on data.

[First Exemplary Embodiment]

Figure 2:
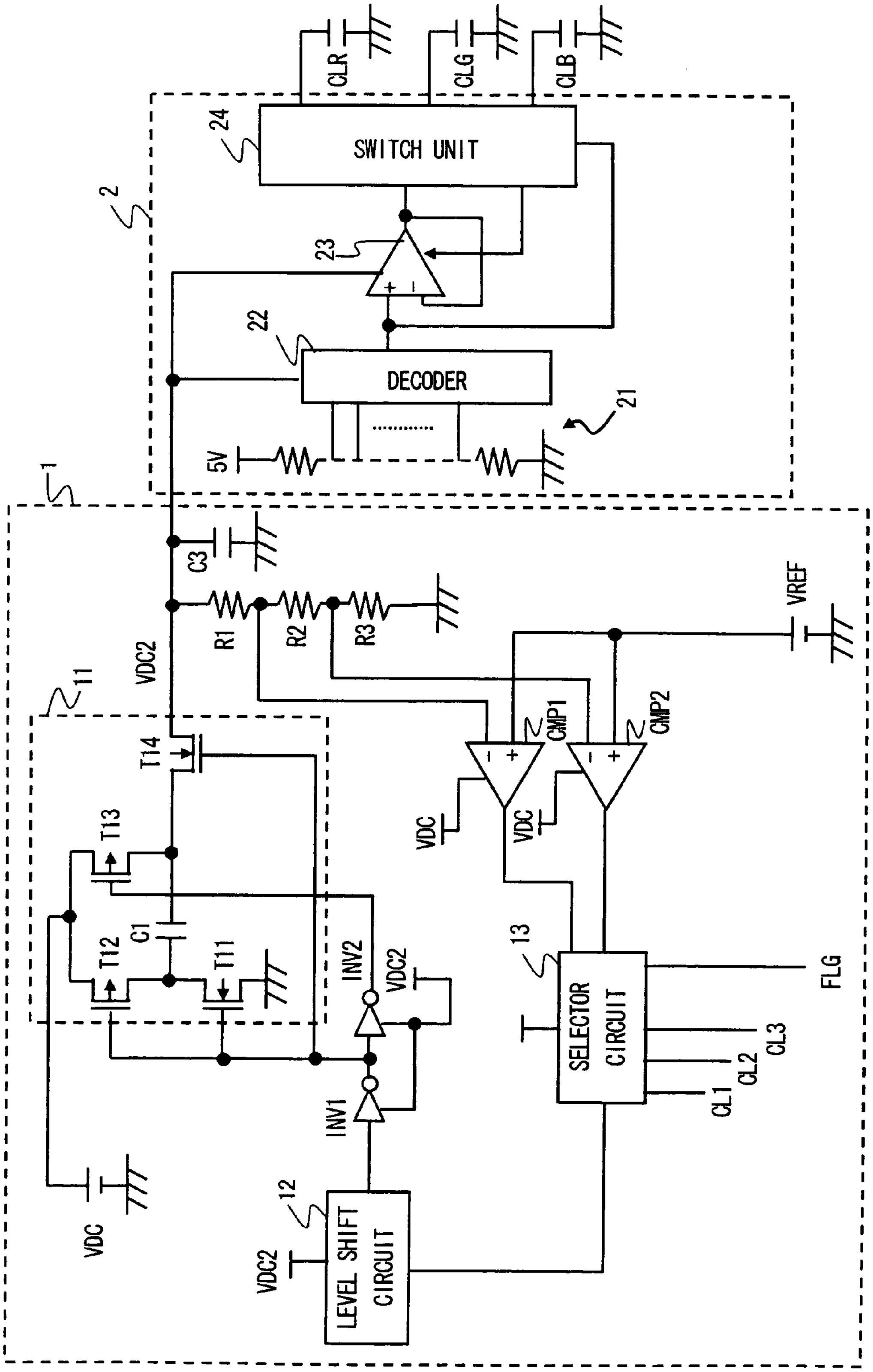
FIG. 2 is a circuit diagram showing a display panel drive apparatus according to a first exemplary embodiment.

FIG. 2 is a circuit diagram of a display panel drive apparatus according to a first exemplary embodiment of the present invention. The display panel drive apparatus includes a booster circuit 1 and a source drive circuit (source driver) 2. The circuits shown in FIG. 2 are included in the above-described power supply circuit 104 and data-side drive circuit 102, respectively. Practically, the data-side drive circuit 102 includes a plurality of source drivers 2. The plurality of source drivers 2 are connected to share the booster circuit 1. Hereinafter, description will be given focusing on one source driver 2.

The booster circuit 1 boosts a supply voltage VDC, and outputs the boosted voltage as an output voltage VDC2. The source driver 2 is powered by the output voltage VDC2 from the booster circuit 1. The source driver 2 generates an analog voltage corresponding to data to drive the panel capacitors. As the time-divisional driving is carried out according to the present exemplary embodiment, one source driver 2 drives panel capacitors CLR, CLG and CLB respectively corresponding to the three dots (R, G, B) constituting one pixel.

The booster circuit 1 includes a charge pump 11, voltage divider resistors R1 to R3, a smoothing capacitor C3, comparators CMP1 and CMP2, a selector circuit 13, a level shift circuit 12, and inverters INV1 and INV2.

The charge pump 11 includes transistors T11 to T14 and a booster capacitor C1. The charge pump circuit 11 performs a double boosting operation by charge pumping. The transistor T11 is an N-channel MOS transistor. The source of the transistor T11 is grounded. The drain of the transistor T11 is connected to the drain of the transistor T12 and the booster capacitor C1. The transistor T12 is a P-channel MOS transistor. The source of the transistor T12 is connected to the supply voltage VDC. A node connected to the other electrode of the booster capacitor C1 is connected to the drain of the transistor T13. This node is also connected to the output (output supply voltage VDC2) of the charge pump circuit 11 via the P-channel MOS transistor T14. The transistor T13 is a P-channel MOS transistor. The source of the transistor T13 is connected to the supply voltage VDC. The gates of the transistors T11, T12, and T14 are connected to the output of the inverter INV1 and driven thereby. The output of the inverter INV 1 is further connected to the gate of the transistor T13 via the inverter INV2.

Between the output of the charge pump 11 and the ground potential, the voltage divider resistors R1 to R3 are connected in series. The voltage divider resistors R1 to R3 divide the output VDC2 of the charge pump 11. The smoothing capacitor C3 is connected in parallel with the voltage divider resistors R1 to R3. The smoothing capacitor C3 is connected between the output of charge pump 11 and the ground potential. The smoothing capacitor C3 smoothes the output VDC2 of the charge pump 11. The voltage at the voltage division point between the voltage divider resistors R1 and R2 is input to an inverting input terminal of the comparator CMP1. The voltage at the voltage division point between the voltage divider resistors R2 and R3 is input to an inverting input terminal of the comparator CMP2. A reference voltage VREF is input to non-inverting input terminals of the comparators CMP1 and CMP2.

The comparator CMP1 compares the reference voltage VREF with the voltage at the voltage division point between the voltage divider resistors R1 and R2 being generated based on the voltage VDC2. The comparator CMP1 outputs "H" level when the voltage VDC2 is smaller than a first voltage value. Here, it is assumed that the comparator CMP1 outputs "H" level when VDC2<5.4V.

The comparator CMP2 compares the reference voltage VREF with the voltage at the voltage division point between the voltage divider resistors R2 and R3 being generated based on the voltage VDC2. The comparator CMP2 outputs "H" level when the voltage VDC2 is smaller than a second voltage value. Here, it is assumed that the comparator CMP2 outputs "H" level when VDC2<5.6V. The outputs of the comparators CMP1 and CMP2 are input to the selector circuit 13.

The selector circuit 13 is fed with a plurality of clocks CL1, CL2 and CL3 and a flag signal FLG. Based on the signals input from the comparators CMP1 and CMP2 and the flag signal, the selector circuit 13 selects and outputs any clock from among the plurality of clocks.

The level shift circuit 12 converts a signal, being output from the selector circuit 13 and having a VDC-level amplitude, into a signal having a VDC2-level amplitude, and provides the converted signal to the inverter INV1. The inverter INV1 inverts the signal received from the level shift circuit 12 and provides the inverted signal to the gates of the transistors T11, T12 and T14 and the inverter INV2. The inverter INV2 inverts the signal received from the inverter INV1 and provides the inverted signal to the gate of the transistor T13.

The source driver 2 includes a gamma resistor 21, a decoder 22, a source amplifier 23, and a switch unit 24.

The gamma resistor 21 generates reference voltages for gamma correction. The decoder 22 selects from among the reference voltages the voltage specified by display data, to generate a desired gradation voltage. The gradation voltage is subjected to a current amplification by the source amplifier 23 connected as a voltage follower, and provided to the liquid crystal display panel. The switch unit 24 switches among the connections respectively between the output of the source amplifier 23 and the panel capacitors respectively corresponding to the R, G and B dots, based on a time-divisional signal. As described above, the liquid crystal display panel according to the present exemplary embodiment is a time-divisionally driven liquid crystal display panel. Accordingly, during one horizontal period, the output is carried out time-divisionally with respect to the dot corresponding to the R element (panel capacitor CLR), the dot corresponding to the G element (panel capacitor CLG), and the dot corresponding to the B element (panel capacitor CLB). Therefore, the liquid crystal panel display apparatus is fed with a signal referred to as a time divisional clock for performing the time-divisional operation in one horizontal period. The switch unit 24 performs a switching operation based on the time-divisional clock, to drive the panel capacitors CLR, CLG and CLB.

An operation of the display panel drive apparatus configured as described above will be described in detail in the following. First, description will be given on a basic operation of the display panel drive apparatus according to the present exemplary embodiment.

As described above, the display panel drive apparatus according to the present exemplary embodiment includes the comparators CMP1 and CMP2. The selector circuit 13 is fed with a plurality of types of clocks CL1 to CL3. While the clocks CL1 to CL3 may be of any clock cycle, it is assumed in the present exemplary embodiment that the clocks provided as the CL1 to CL3 each have the cycle of an even multiple of the time-divisional clock with a 50% duty ratio. In the display panel drive apparatus according to the present exemplary embodiment, the comparators CMP1 and CMP2 determine as to the output voltage VDC2 of the charge pump 11. Based on the determination result, the selector circuit 13 selects an input clock to the charge pump 11.

Figure 3:
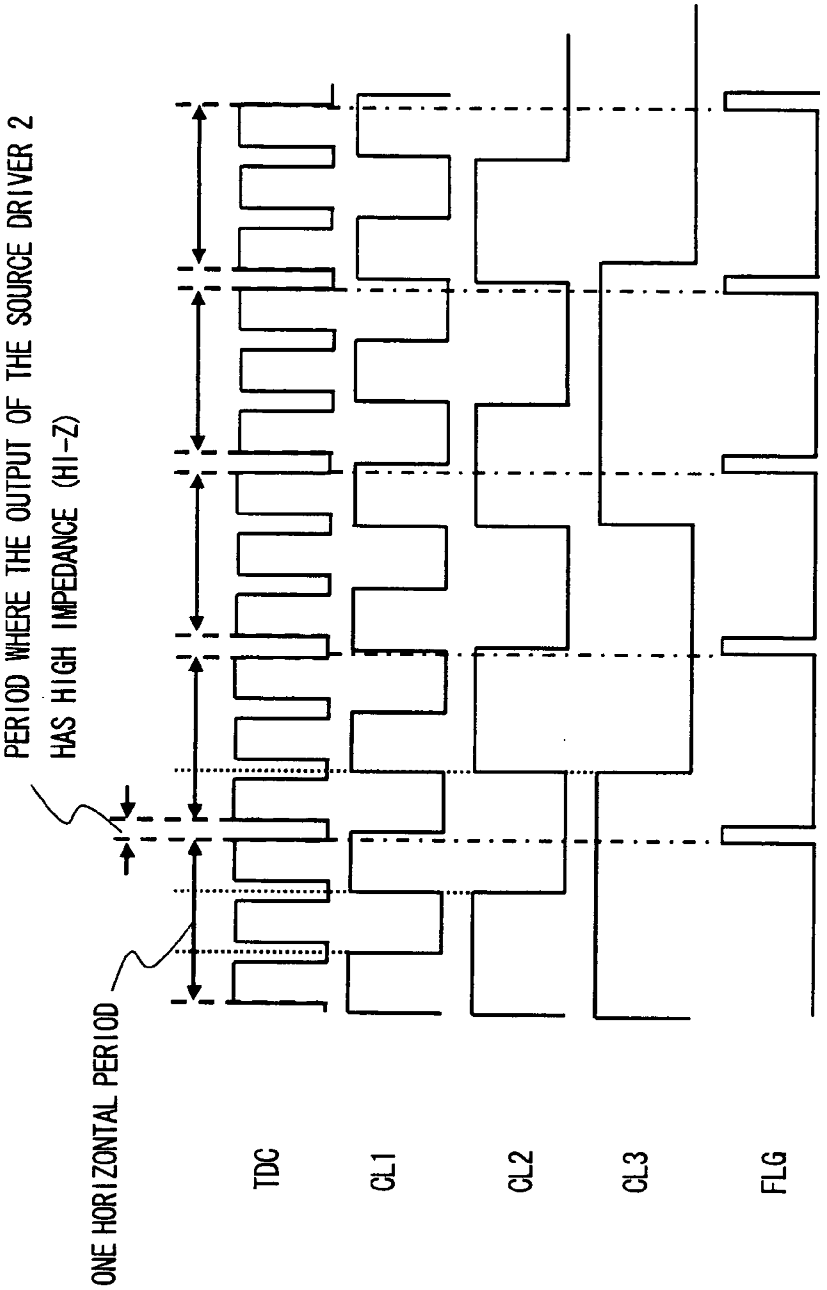
FIG. 3 is a timing chart for describing operations in the first exemplary embodiment.

Here, referring to FIG. 3, description will be given on the time-divisional clock in the present exemplary embodiment and the clocks input to the charge pump 11 as well as the timing for switching them. As shown in FIG. 3, in the display panel drive apparatus according to the present exemplary embodiment, a time divisional clock TDC for performing the time-divisional driving during one horizontal period is being input. When, for example, the dots respectively corresponding to the R, G and B elements are driven during one horizontal period, the time-divisional clock TDC is input by three clocks for one horizontal period so as to correspond to respective dots.

Between each horizontal period, there is a period where the output of the source driver 2 has high impedance (Hi-Z).

Here, in the present exemplary embodiment, the rising and falling edges of the clocks CL1 to CL3 for driving the charge pump 11 are assigned to sections where the time divisional clock TDC is at "L" level, i.e., charging or discharging none of the dots. By assigning the edges of the clock input into the charge pump in such a manner, even with a time-divisionally driven liquid crystal display panel, regardless of whichever of the panel capacitors associated with respective color elements (RGB) is driven during one horizontal period, rise or fall of a clock being input to the charge pump 11 will not occur during such an operation. Therefore, displaying-related noises attributed to the rise or fall of the clock to the charge pump will not affect the output voltage VDC2. Consequently, displaying-related noises on the display panel can be reduced.

Furthermore, as in the foregoing description as to the basic operation of the display panel drive apparatus according to the present exemplary embodiment, input clocks to the charge pump 11 can be switched in the present exemplary embodiment. This operation is performed based on the flag signal FLG being in synchronization with the Hi-Z period of the source driver 2. That is, when the flag signal FLG attains "H" level, the selector circuit 13 reads the output of the comparators CMP1 and CMP2, and selects a clock to be supplied to the charge pump 11 in the next horizontal period. With this operation, the frequency of the clock being input to the charge pump 11 will not be varied within one horizontal period. Hence, displaying-related noise can also be prevented, which would otherwise occur due to variations in the power supply to the source driver during one horizontal period.

[Second Exemplary Embodiment]

Figure 4:
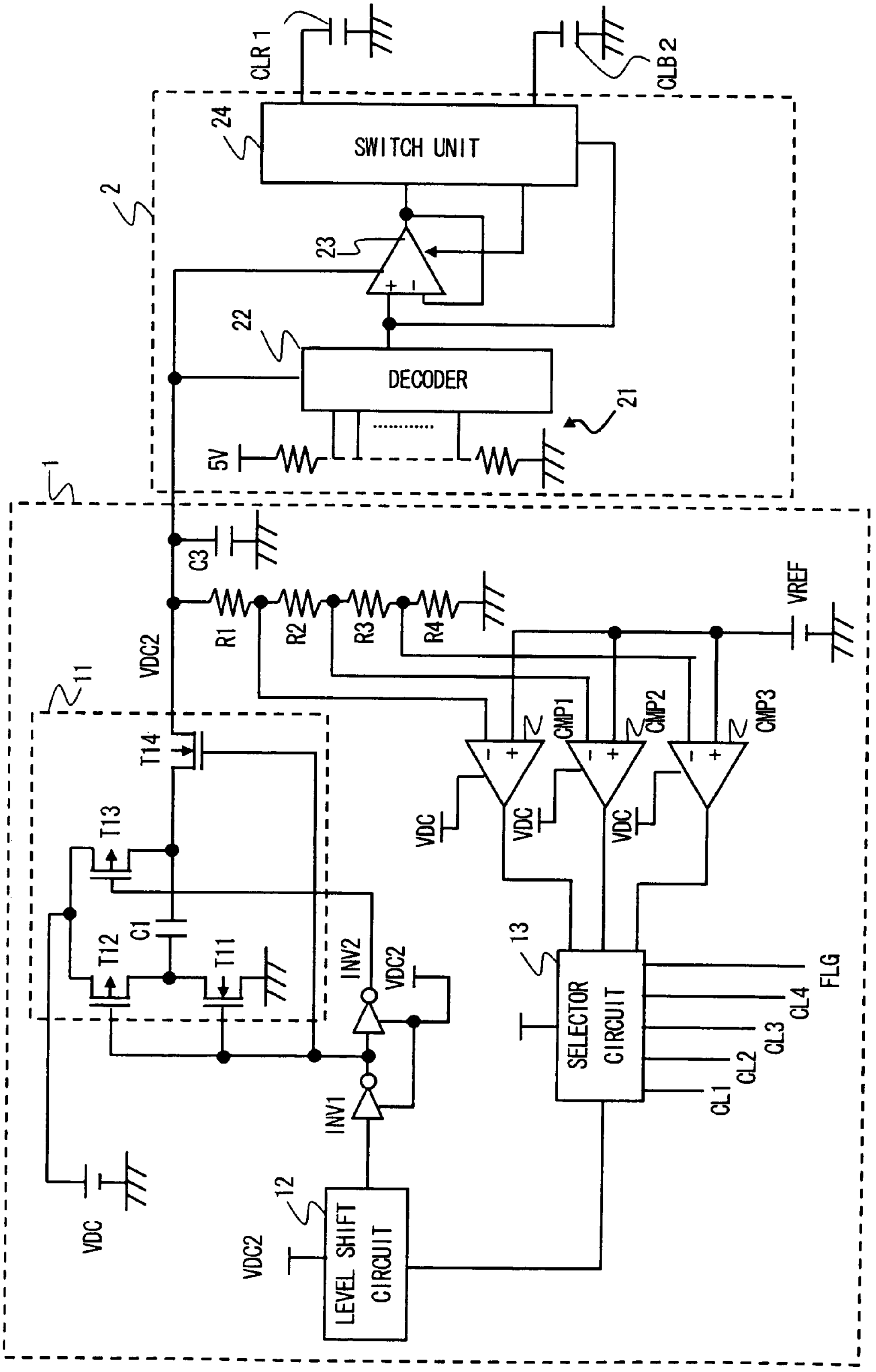
FIG. 4 is a circuit diagram showing a display panel drive apparatus according to a second exemplary embodiment.

FIG. 4 is a circuit diagram showing a display panel drive apparatus according to a second exemplary embodiment of the present invention. In FIG. 4, constituents shown similarly in FIG. 2 are given the same reference characters, and detailed description thereof will not be repeated.

The display panel drive apparatus of the present exemplary embodiment is an exemplary application of the present invention to a liquid crystal panel display apparatus supporting six time-divisional outputs, i.e., RGB3×2. That is, in the present exemplary embodiment, six dots (CLR1 to CLB2) corresponding to RGB3×2 are driven during one horizontal period.

In the following, description will be given only on main differences from the first exemplary embodiment. In the first exemplary embodiment, the voltage divider resistors connected to the output of the charge pump 11 are formed by the three resistors R1 to R3. On the other hand, one voltage divider resistor is added in the present exemplary embodiment so that the voltage divider resistors are formed by the resistors R1 to R4. As in the first exemplary embodiment, a voltage at the voltage division point between the voltage divider resistors R1 and R2 is input to the inverting input terminal of the comparator CMP1, and a voltage at the voltage division point between the voltage divider resistors R2 and R3 is input to the inverting input terminal of the comparator CMP2. In the present exemplary embodiment, a further comparator CMP3 is added. A voltage at the voltage division point between the voltage divider resistor R3 and R4 is input to the inverting input terminal of the comparator CMP3. Similarly to the comparators CMP1 and CMP2, the reference voltage VREF is input to the non-inverting input terminal of the comparator CMP3.

The comparator CMP3 compares the reference voltage VREF with the voltage at the voltage division point between the voltage divider resistors R3 and R4 being generated based on the voltage VDC2. Then, the comparator CMP3 outputs "H" level when the voltage VDC2 is smaller than a third voltage value. Here, it is assumed that the comparator CMP3 outputs "H" level when VDC2<5.7V.

A further clock input to the selector circuit 13 is added, i.e., the clock CL4 is being input to the selector circuit 13. That is, the selector circuit 13 selects and outputs any clock from among the clocks CL1 to CL4 based on the output of the comparators CMP1 to CMP3.

In the case where the six dots are driven in one horizontal period, loads on the source driver become heavier. Accordingly, the comparators monitoring the supply voltage to the source driver as well as the clocks input to the charge pump are increased, whereby the voltage boosting operations can be controlled with improved delicacy.

Figure 5:
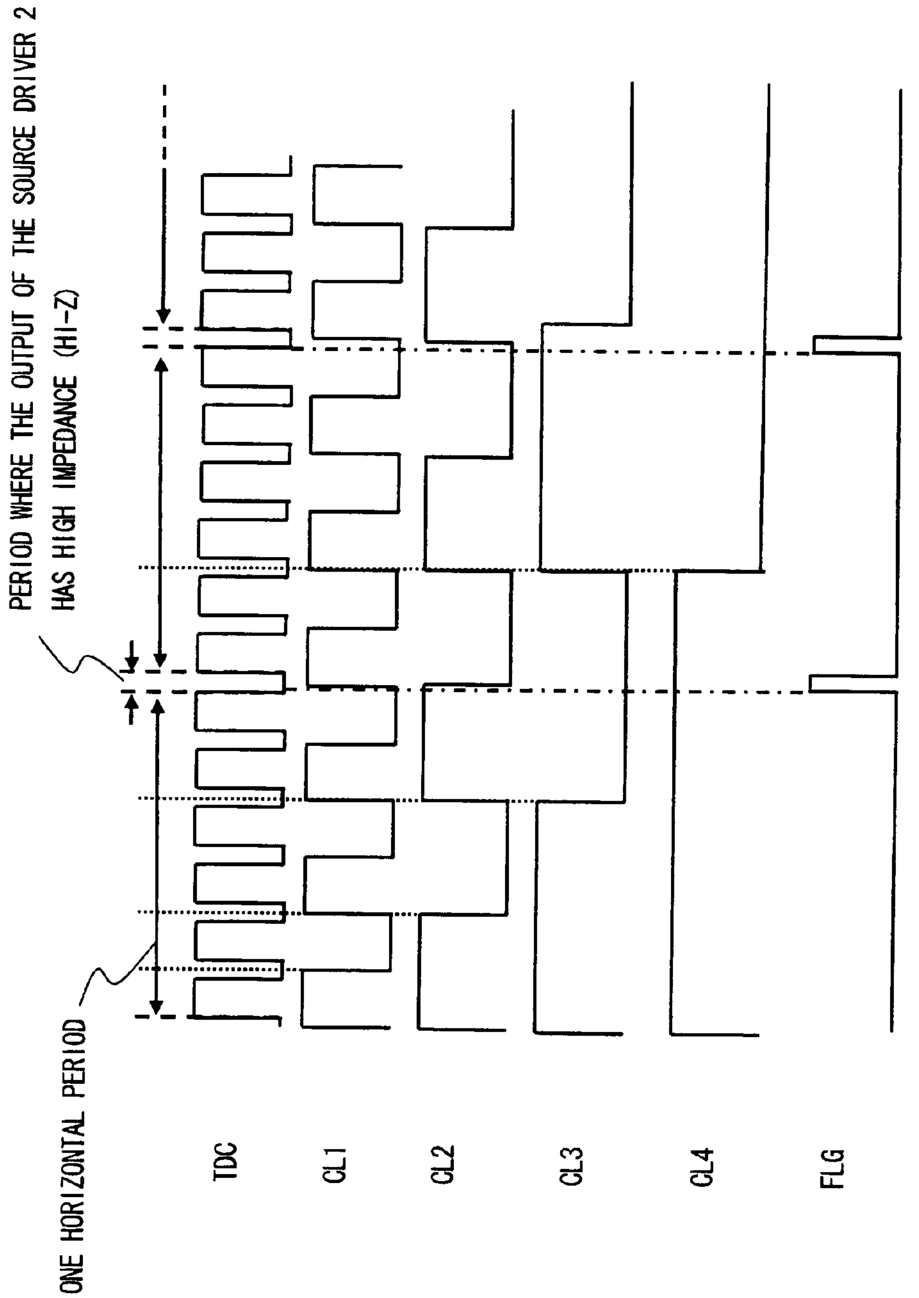
FIG. 5 is a timing chart for describing operations in the second exemplary embodiment.

FIG. 5 shows the relation among the time-divisional clock TDC, the clocks CL1 to CL4 being input to the selector, and the flag signal FLG in this case. It is to be noted that the added clock CL4 also has the rising and falling edges being in synchronization with the period where the time-divisional clock TDC is at "L" level, thereby attaining the same effect shown in the first exemplary embodiment. In the present exemplary embodiment, all the operations are the same as in the first exemplary embodiment except that the number of the time-divisional clocks corresponding to one horizontal period is six. Therefore, detailed description thereof will not be repeated.

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A display panel drive apparatus performing a time-divisional driving operation during one horizontal period, comprising:

a source driver that drives each unit dot in accordance with a time-divisional clock; and a booster circuit that generates a supply voltage to be supplied to the source driver based on a clock having a rising edge and a falling edge each coinciding with an off-period of the time-divisional clock, wherein the booster circuit is fed with a plurality of the clocks each having a rising edge and a falling edge each coinciding with an off-period of the time-divisional clock, and selects any one of the plurality of fed clocks based on the supply voltage output from the booster circuit, to perform a voltage boosting operation.

2. The display panel drive apparatus according to claim 1, wherein the booster circuit includes a comparator that compares the supply voltage generated by the booster circuit with a reference voltage, and selects any one of the plurality of fed clocks in accordance with a result of the comparison by the comparator.

3. A display panel drive apparatus performing a time-divisional driving operation during one horizontal period, comprising:

a source driver that drives each unit dot in accordance with a time-divisional clock; and a booster circuit that generates a supply voltage to be supplied to the source driver based on a clock having a rising edge and a falling edge each coinciding with an off-period of the time-divisional clock, wherein the booster circuit is fed with a plurality of the clocks each having a rising edge and a falling edge each coinciding with an off-period of the time-divisional clock, and selects any one of the plurality of fed clocks based on the supply voltage output from the booster circuit, to perform a voltage boosting operation, the one of the plurality of fed clocks being selected during an interval period between one horizontal period and another horizontal period.

4. A display panel drive method for performing a time-divisional driving operation during one horizontal period, comprising:

driving each unit dot in accordance with a time-divisional clock; and generating a supply voltage to be supplied to a source driver that drives each unit dot based on a clock having a rising edge and a falling edge each coinciding with an off-period of the time-divisional clock, wherein a plurality of the clocks each having a rising edge and a falling edge each coinciding with an off-period of the time-divisional clock are fed, and any one of the plurality of fed clocks is selected based on the supply voltage supplied to the source driver.

* * * * *